US011964563B2

(12) United States Patent
Yokochi et al.

(10) Patent No.: US 11,964,563 B2
(45) Date of Patent: Apr. 23, 2024

(54) VEHICLE DISPLAY CONTROL DEVICE, CONTROL METHOD OF VEHICLE DISPLAY CONTROL DEVICE AND STORAGE MEDIUM

(71) Applicant: HONDA MOTOR CO., LTD., Tokyo (JP)

(72) Inventors: Satoko Yokochi, Tokyo (JP); Yuta Murayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 17/672,736

(22) Filed: Feb. 16, 2022

(65) Prior Publication Data
US 2022/0305912 A1 Sep. 29, 2022

(30) Foreign Application Priority Data

Mar. 25, 2021 (JP) .................................. 2021-051623

(51) Int. Cl.
*B60W 40/06* (2012.01)
*B60K 35/00* (2006.01)
(Continued)

(52) U.S. Cl.
CPC ............. *B60K 35/00* (2013.01); *B60W 40/06* (2013.01); *B60K 35/10* (2024.01); *B60K 35/28* (2024.01);
(Continued)

(58) Field of Classification Search
CPC . B60K 35/00; B60W 40/06; B60W 2370/119; B60W 2370/1868;
(Continued)

(56) References Cited

U.S. PATENT DOCUMENTS

| 2019/0283754 A1* | 9/2019 | Toda | G06V 20/584 |
| 2020/0080864 A1* | 3/2020 | Ichinokawa | G01C 21/3667 |
| 2020/0086890 A1* | 3/2020 | Ikeda | B60W 30/18163 |

FOREIGN PATENT DOCUMENTS

| CN | 110155053 A | * | 8/2019 | ............ B60W 30/18 |
| JP | 11-264868 | | 9/1999 | |
| JP | 2018154218 A | * | 10/2018 | |

OTHER PUBLICATIONS

CN-110155053-A (Won-Ju et al.) (Aug. 23, 2019) (Machine Translation) (Year: 2019).*

* cited by examiner

*Primary Examiner* — Mahmoud Gimie
(74) *Attorney, Agent, or Firm* — Amin, Turocy & Watson, LLP

(57) ABSTRACT

A vehicle display control device includes a processor configured to execute computer-readable instructions to perform. The processor is configured to recognizing road markings of a road on which a host vehicle travels based on at least an output of a detection device that detects target objects present in a traveling direction of the host vehicle; causing a display device to display a surrounding situation display image including a host vehicle icon representing the host vehicle and an image of the road markings representing the road; determining positions of the road markings based on information of center positions of a traveling lane obtained by representing the center positions in a point sequence for each prescribed first distance with respect to a first direction; and generating the surrounding situation display image.

7 Claims, 8 Drawing Sheets

(51) Int. Cl.
*B60K 35/10* (2024.01)
*B60K 35/28* (2024.01)
*B60K 35/29* (2024.01)

(52) U.S. Cl.
CPC ......... *B60K 35/29* (2024.01); *B60K 2360/119* (2024.01); *B60K 2360/179* (2024.01); *B60K 2360/1868* (2024.01); *B60W 2552/53* (2020.02); *B60W 2554/4041* (2020.02); *B60W 2554/80* (2020.02)

(58) Field of Classification Search
CPC ... B60W 2370/179; B60W 2554/4041; B60W 2554/80; B60W 2552/53
USPC .......................................................... 701/41
See application file for complete search history.

VEHICLE DISPLAY CONTROL DEVICE, CONTROL METHOD OF VEHICLE DISPLAY CONTROL DEVICE AND STORAGE MEDIUM

CROSS-REFERENCE TO RELATED APPLICATION

Priority is claimed on Japanese Patent Application No. 2021-051623, filed Mar. 25, 2021, the content of which is incorporated herein by reference.

BACKGROUND OF THE INVENTION

Field of the Invention

The present invention relates to a vehicle display control device, a control method of the vehicle display control device, and a storage medium.

Description of Related Art

Conventional technology relating to a vehicle display device that presents a relative positional relationship associated with another vehicle traveling near or in front of the host vehicle to a driver or the like has been disclosed (for example, Japanese Unexamined Patent Application, First Publication No. H11-264868). In the conventional technology, a situation of the surroundings of the host vehicle is detected and an image including a lane in which the host vehicle is traveling and a vehicle mark indicating the host vehicle or another vehicle is displayed on a display device. Thereby, in the conventional technology, the driver or the like can easily associate another vehicle actually traveling in front of the host vehicle with a displayed vehicle mark and ascertain the situation of the surroundings of the host vehicle.

Incidentally, because the image for displaying the situation of the surroundings of the host vehicle has a large amount of information, the load of communication to be performed is large when the image is displayed. However, the transmission of the image to be displayed is not taken into consideration in the conventional technology. Thus, the data communication capacity may be limited when the image to be displayed is transmitted in the conventional technology.

SUMMARY OF THE INVENTION

The present invention has been made on the basis of recognition of the above-described problems and an objective of the present invention is to provide a vehicle display control device, a control method of the vehicle display control device, and a storage medium capable of reducing the amount of communication in a processing process until an image for allowing a driver to recognize a relative positional relationship associated with the surroundings of a host vehicle and another vehicle is displayed.

A vehicle display control device, a control method of the vehicle display control device, and a storage medium according to the present invention adopt the following configurations.

(1): According to an aspect of the present invention, there is provided a vehicle display control device including a processor configured to execute computer-readable instructions to perform: recognizing road markings of a road on which a host vehicle travels based on at least an output of a detection device that detects target objects present in a traveling direction of the host vehicle; causing a display device to display a surrounding situation display image including a host vehicle icon representing the host vehicle and an image of the road markings representing the road; determining positions of the road markings based on information of center positions of a traveling lane obtained by representing the center positions in a point sequence for each prescribed first distance with respect to a first direction; and generating the surrounding situation display image.

(2): In the above-described aspect (1), the processor is configured to execute the computer-readable instructions to perform: detecting a lane width of one of traveling lanes at a position of a prescribed second distance associated with the first direction in the host vehicle based on the output of the detection device; and determining the distance between the road markings that have been determined based on the information of the detected lane width.

(3): In the above-described aspect (2), the processor is configured to execute the computer-readable instructions to perform: determining the positions of the road markings by connecting positions offset from the center positions indicated in the information of the center positions in a left-right direction with respect to the lane width of the traveling lane indicated in the information of the lane width.

(4): In the above-described aspect (3), the processor is configured to execute the computer-readable instructions to perform: recognizing a radius of the road based on a plurality of center positions in an overhead view plane viewed from above; and obtaining the information of the center positions by multiplying the recognized radius by a compression degree according to the radius in a second direction orthogonal to the first direction to decrease curvature of a centerline connecting the center positions.

(5): In the above-described aspect (4), the target objects further include another vehicle that is traveling in front of the host vehicle, the processor is configured to execute the computer-readable instructions to perform: when the another vehicle has been recognized, detecting a third distance between a reference position of the another vehicle and a position close to the reference position among positions on the road marking at a position corresponding to the second direction of the center position closest to the reference position of the another vehicle; determining the amount of offset from the road marking associated with the position close to the reference position based on the information of the third distance; and generating the surrounding situation display image including another vehicle icon representing the another vehicle at a position where the another vehicle is present determined by the amount of offset.

(6): In the above-described aspect (5), the processor is configured to execute the computer-readable instructions to perform: recognizing whether the another vehicle is traveling in front of the host vehicle in the traveling lane or traveling in an adjacent lane adjacent to the traveling lane based on the output of the detection device; when it is recognized that the another vehicle is traveling in the adjacent lane, determining the amount of offset based on information of a distance obtained by multiplying the third distance by a second compression degree according to the radius after curvature of the centerline is decreased; and when it is recognized that the another vehicle is traveling in front of the host vehicle in the traveling lane, determining the amount of offset based on the information of the third distance as it is.

(7): In any one of the above-described aspects (4) to (6), the processor is configured to execute the computer-readable instructions to perform: increasing the compression degree as the radius of the road decreases.

(8): In the above-described aspect (7), the processor is configured to execute the computer-readable instructions to perform: increasing the compression degree to a highest degree when the radius of the road is less than or equal to a first prescribed value, changing the compression degree to cause the compression degree decreases from the first prescribed value to a second prescribed value in accordance with the radius of the road, and decreasing the compression degree to the lowest degree when the radius of the road is greater than or equal to the second prescribed value.

(9): According to an aspect of the present invention, there is provided a control method of a vehicle display control device including: recognizing, by a computer, road markings of a road on which a host vehicle travels based on at least an output of a detection device that detects target objects present in a traveling direction of the host vehicle; representing, by the computer, center positions of a traveling lane in a point sequence for each prescribed first distance with respect to a first direction based on the recognized road markings; and determining, by the computer, positions of the road markings based on information of the center positions when a display device is allowed to display a surrounding situation display image including a host vehicle icon representing the host vehicle and an image of the road markings representing the road.

(10): According to an aspect of the present invention, there is provided a non-transitory computer-readable storage medium storing a program for causing a computer to: recognize road markings of a road on which a host vehicle travels based on at least an output of a detection device that detects target objects present in a traveling direction of the host vehicle; represent center positions of a traveling lane in a point sequence for each prescribed first distance with respect to a first direction based on the recognized road markings; and determine positions of the road markings based on information of the center positions when a display device is allowed to display a surrounding situation display image including a host vehicle icon representing the host vehicle and an image of the road markings representing the road.

According to the above-described aspects (1) to (10), it is possible to reduce the amount of information in an image for allowing a driver to recognize a relative positional relationship associated with surroundings of a host vehicle and another vehicle.

DETAILED DESCRIPTION OF THE INVENTION

Embodiments of a vehicle display control device, a control method of the vehicle display control device, and a storage medium of the present invention will be described.

As used throughout this disclosure, the singular forms "a," "an," and "the" include plural reference unless the context clearly dictates otherwise.

[Configuration of Vehicle Display Control Device]

Figure 1:
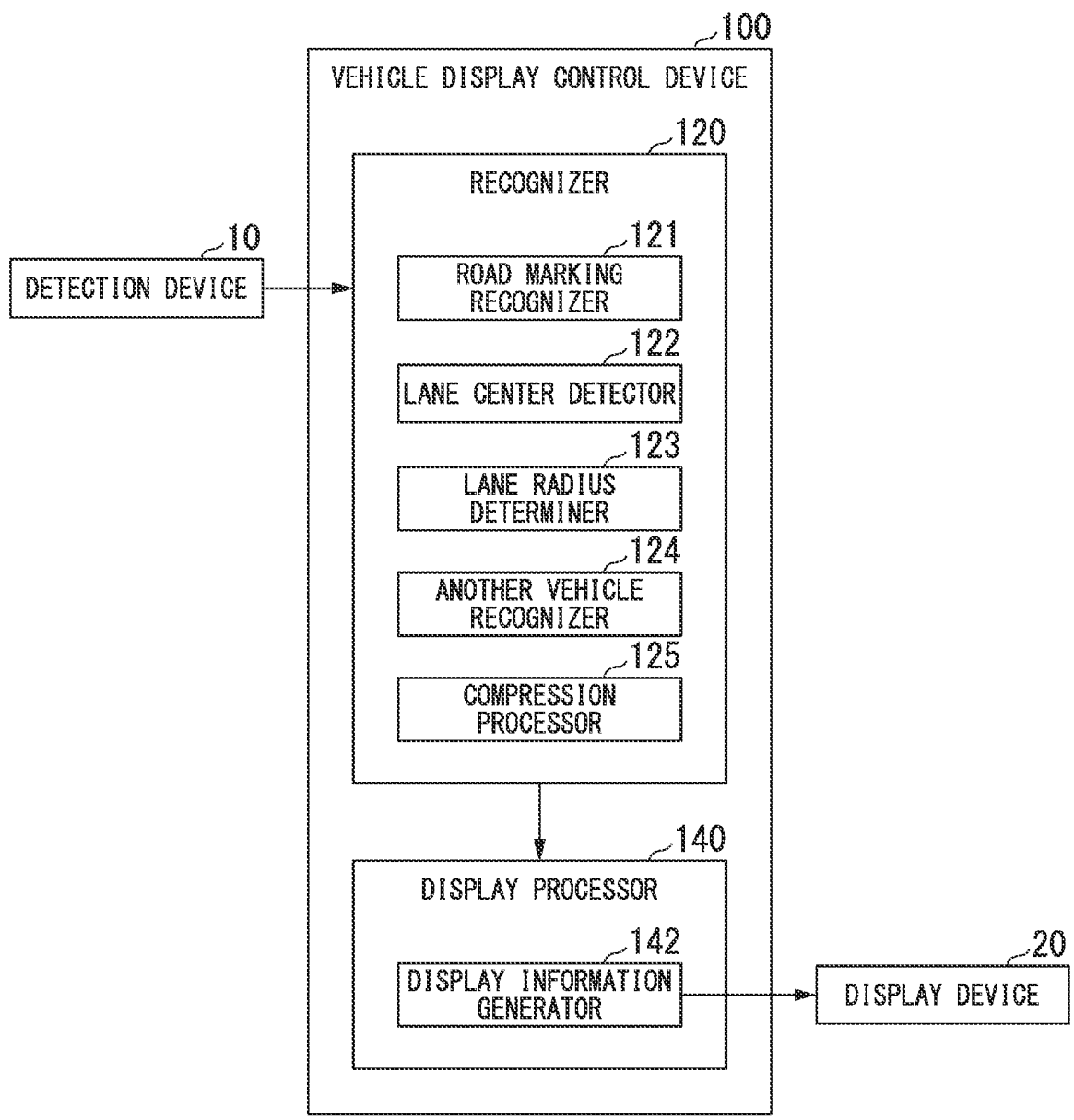
FIG. 1 is a schematic configuration diagram of a vehicle display control device according to an embodiment.

FIG. 1 is a schematic configuration diagram of the vehicle display control device according to the embodiment. A vehicle in which the vehicle display control device is mounted is, for example, a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

In FIG. 1, a detection device 10 and a display device 20 are shown as components associated with the vehicle display control device 100 among components provided in the vehicle (hereinafter referred to as a "host vehicle M") in which the vehicle display control device 100 is mounted.

The detection device 10 detects target objects present in a traveling direction of the host vehicle M. The target objects include, for example, road markings drawn on a road on which the host vehicle M is traveling or another vehicle (hereinafter referred to as "another vehicle V") traveling in the same direction as the host vehicle M. The detection device 10 is, for example, a digital camera using a solid-state image sensor such as a charge-coupled device (CCD) or a complementary metal-oxide semiconductor (CMOS). In this case, the detection device 10 is attached to at least any location where the view in front of the host vehicle M can be imaged. The detection device 10 is attached to, for example, an upper part of a front windshield, a rear surface of a rearview mirror, or the like. The detection device 10 periodically and repeatedly images the surroundings of the host vehicle M, for example, at prescribed time intervals. The detection device 10 may be a stereo camera. The detection device 10 outputs image data obtained in an imaging process thereof to the vehicle display control device 100. The detection device 10 may output information indicating the detected target objects to the vehicle display control device 100. In addition to the camera, the detection device 10 may include a radar device or a light detection and ranging (LIDAR) sensor.

The display device 20 displays an information image showing various types of information presented to the driver of the host vehicle M. The display device 20 is, for example, a display device such as a liquid crystal display (LCD) incorporated in a dashboard or an instrument panel of the host vehicle M. The display device 20 displays a traveling state display image showing a traveling state of the host vehicle M and a surrounding situation display image showing the situation of the surroundings of the host vehicle M output by the vehicle display control device 100. The traveling state display image includes, for example, an image of a speedometer indicating a speed at which the host vehicle M is traveling, and a tachometer indicating the number of rotations (a rotational speed) of the internal combustion engine provided in the host vehicle M. The traveling state display image may include, for example, an image of a fuel consumption meter, an odometer, a clock, and the like.

The vehicle display control device 100 includes, for example, a recognizer 120 and a display processor 140. The recognizer 120 includes, for example, a road marking recognizer 121, a lane center detector 122, a lane radius determiner 123, an another vehicle recognizer 124, and a compression processor 125. The display processor 140 includes, for example, a display information generator 142. These components are implemented, for example, by a hardware processor such as a central processing unit (CPU) executing a program (software). Some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of functions of these components may be implemented by a dedicated LSI circuit. The program may be prestored in a storage device (a storage device including a non-transitory storage medium) such as a hard disk drive (HDD) or a flash memory provided in the host vehicle M or may be stored in a removable storage medium (a non-transitory storage medium) such as a DVD or a CD-ROM and installed in the HDD or the flash memory provided in the host vehicle M when the storage medium is mounted in a drive device provided in the host vehicle M.

In the vehicle display control device 100, the recognizer 120 and the display processor 140 may be arranged at separate positions within the host vehicle M. In this case, the recognizer 120 and the display processor 140 may be connected to each other using a multiple communication line such as a controller area network (CAN) communication line constructed within the host vehicle M, a serial communication line, a wireless communication network, or the like. In the following description, it is assumed that the recognizer 120 and the display processor 140 are connected by a signal line in the vehicle display control device 100. If the recognizer 120 and the display processor 140 are connected by a communication line in the vehicle display control device 100, it is only necessary for the components included in the recognizer 120 to be described below to replace a process of "outputting" information and data to the display processor 140 with a process of "transmitting" information or data.

The recognizer 120 recognizes a road in a traveling direction in which the host vehicle M travels on the basis of image data output by the detection device 10. Further, the recognizer 120 recognizes another vehicle V traveling in front of the host vehicle M on the basis of the image data output by the detection device 10. Another vehicles V that are recognized by the recognizer 120 include another vehicle V that travels on a road (in a traveling lane) in a traveling direction in which the host vehicle M travels and another vehicle V that travels in another traveling lane (another adjacent lane) adjacent to the traveling lane of the host vehicle M. The recognizer 120 converts information of the recognized road and information of the recognized another vehicles V so that the display processor 140 uses the converted information to generate the surrounding situation display image. The recognizer 120 outputs the converted information of the road and the converted information of the another vehicles V to the display processor 140.

The road marking recognizer 121 recognizes road markings drawn on the road in the traveling direction in which the host vehicle M travels on the basis of the image data output by the detection device 10. More specifically, the road marking recognizer 121 generates overhead view data in which an area of a road surface in front of the host vehicle M imaged in the image data is represented as if viewed from above (for example, directly above) virtually on the basis of the image data output by the detection device 10. The road marking recognizer 121 recognizes a white line drawn on the road surface in front of the host vehicle M as the road marking from the generated overhead view data. The road marking recognizer 121 may recognize a traveling road boundary (a road boundary) including a yellow line, a road shoulder, a curbstone, a median strip, a guardrail, and the like as well as the white line. The road marking recognizer 121 outputs information of the recognized road markings to each of the lane center detector 122 and the another vehicle recognizer 124. The information of the road markings output by the road marking recognizer 121 to the lane center detector 122 and the another vehicle recognizer 124 also includes information indicating whether the road marking is a left road marking or a right road marking. This information is determined, for example, by an angle of view of the image data output by the detection device 10. For example, when the road marking recognizer 121 cannot recognize one of the road markings, the road marking recognizer 121 outputs information of the recognized road marking to each of the lane center detector 122 and the another vehicle recognizer 124.

Further, the road marking recognizer 121 detects the width of one traveling lane (hereinafter referred to as a "lane width") at a position of a prescribed distance (for example, 2 to 3 [m]) from the host vehicle M in a forward direction on the basis of image data output by the detection device 10. The road marking recognizer 121 may detect the lane width on the basis of the recognized road marking. The road marking recognizer 121 outputs information indicating the detected lane width to the display processor 140. Here, the information of the lane width output by the road marking recognizer 121 to the display processor 140 is information of one lane width. Thus, when the recognizer 120 and the display processor 140 are arranged at separate positions in the host vehicle M and are connected by communication lines, the amount of communication for transmitting lane width information is reduced. That is, the load of communication between the recognizer 120 and the display processor 140 is reduced. The prescribed distance in front of the host vehicle M in which the road marking recognizer 121 detects the lane width is an example of a "second distance" in the claims.

The lane center detector 122 detects a center position of the traveling lane in which the host vehicle M travels on the basis of information of the road markings output by the road marking recognizer 121. More specifically, the lane center detector 122 measures the distance between the left and right road markings of the traveling lane, i.e., the width of the traveling lane, for each interval of a prescribed distance (for example, 50 [m]) as the distance from the host vehicle M in the forward direction from the information of the road markings output by the road marking recognizer 121. When the information of the road markings output by the road marking recognizer 121 does not include information of either the left or right road marking, the lane center detector 122 may, for example, assume the width is a width equal to that of a nearby traveling lane that has been measured when the information of both the left and right road markings is included or assume the width (for example, 3.4 [m]) of a general lane as the width of the traveling lane. The lane center detector 122 detects a middle position of the measured width of the traveling lane, i.e., a half-width position, as the center position of the traveling lane. The lane center detector 122 outputs information representing a point sequence of center positions detected for each prescribed distance (hereinafter simply referred to as "center position information") to each of the lane radius determiner 123, the another vehicle recognizer 124, and the compression processor 125. The interval of a prescribed distance in front of the host vehicle M in which the lane center detector 122 detects the center position is an example of a "first distance" in the claims.

The lane radius determiner 123 determines a radius of the traveling lane in which the host vehicle M travels on the basis of information of the center positions output by the lane center detector 122. That is, the lane radius determiner 123 determines the radius of the curved road in the traveling lane in which the host vehicle M will travel in the future. More specifically, the lane radius determiner 123 obtains the centerline of the traveling lane by connecting the center positions output by the lane center detector 122. The lane radius determiner 123 determines the radius of the traveling lane in which the host vehicle M will travel and pass in the future on the basis of a curvature degree in the overhead view plane represented as if viewed from above (for example, directly above) virtually with respect to of the obtained centerline. The lane radius determiner 123 sequentially determines the radiuses of the traveling lane in which the host vehicle M travels. In other words, even if the host vehicle M will travel on a straight road in the future, the lane radius determiner 123 determines the radius of the traveling lane in which the host vehicle M travels all the time on the basis of the information of the center positions output by the road marking recognizer 121. Thus, when the host vehicle M will travel on a straight road in the future, the lane radius determiner 123 sets a significantly large value as the radius so that the road is determined (considered) to be the straight road. The lane radius determiner 123 may determine the radius of the traveling lane by, for example, applying each center position output by the lane center detector 122 to a prescribed function. The lane radius determiner 123 may determine the radius of the traveling lane in which the host vehicle M travels on the basis of the overhead view data generated by the road marking recognizer 121. Further, for example, the lane radius determiner 123 may determine the radius of the traveling lane in which the host vehicle M travels on the basis of map information indicating a route to a destination set by the driver of the host vehicle M with respect to a navigation device (not shown) provided in the host vehicle M. The lane radius determiner 123 outputs information of the determined radius of the traveling lane in front of the host vehicle M to the compression processor 125.

The another vehicle recognizer 124 recognizes the another vehicle V traveling in front of the host vehicle M on the basis of the image data output by the detection device 10. More specifically, the another vehicle recognizer 124 recognizes the another vehicle V imaged in the image data on the basis of the image data output by the detection device 10. At this time, the another vehicle recognizer 124 also recognizes whether the another vehicle V is traveling in the same traveling lane as the host vehicle M or traveling in the adjacent lane adjacent to the traveling lane on the basis of a position within an angle of view of image data in which a reference position of the another vehicle V is being imaged. The another vehicle recognizer 124 may recognize the another vehicle V on the basis of the overhead view data generated by the road marking recognizer 121. The another vehicle recognizer 124 detects the distance between the recognized another vehicle V and the road marking indicated in the information of the road markings output by the road marking recognizer 121. More specifically, the another vehicle recognizer 124 extracts a center position closest to the reference position of the another vehicle V from among the center positions indicated in the information of the center positions output by the lane center detector 122. Further, the another vehicle recognizer 124 extracts a road marking closer to the another vehicle V from among the road markings indicated in the information of the road markings output by the road marking recognizer 121. The another vehicle recognizer 124 detects the distance between a position on the road marking corresponding to the extracted center position and the reference position of the another vehicle V (hereinafter referred to as "another vehicle distance"). The reference position of the another vehicle V may be, for example, a position of a center of a rear surface (i.e., rear) portion of the another vehicle V or may be a position of a vehicle registration number plate (a so-called license plate) arranged on the rear surface of the another vehicle V. The another vehicle distance detected by the another vehicle recognizer 124 may be, for example, the distance between a position on the extracted road marking and a position of an end portion of a rear surface of the another vehicle V closer to the extracted road marking. The another vehicle recognizer 124 outputs the information of the another vehicle V including the position (the direction, the distance, the lane, or the like) at which the recognized another vehicle V is present and the another vehicle distance to the compression processor 125 on the basis of the host vehicle M. The information of the another vehicle V output by the another vehicle recognizer 124 to the compression processor 125 may include information indicating the vehicle type of the another vehicle V (for example, a passenger car, a truck, a motorcycle, or the like). The another vehicle distance detected by the another vehicle recognizer 124 is an example of a "third distance" in the claims.

The compression processor 125 performs a process (hereinafter referred to as a "compression process") of converting a center position indicated in information of the center positions output by the lane center detector 122 so that the display processor 140 uses the converted center position to arrange the image of the road marking within the surrounding situation display image on the basis of information of the radius of the traveling lane of the host vehicle M output by the lane radius determiner 123. This is because, when the host vehicle M will travel on and pass through a curved road in the future, the image of the road marking is bent to the left or right, so that the display processor 140 is unlikely to arrange all road markings recognized by the road marking recognizer 121 in the surrounding situation display image. Thus, when the host vehicle M will travel on and pass through a curved road in the future, the compression processor 125 performs a compression process (hereinafter referred to as a "radius compression process") of compressing and decreasing the curvature of the centerline of the traveling lane (the curved road) indicated in the information of the center positions output by the lane center detector 122 so that an image of a larger range of the road marking recognized by the road marking recognizer 121 is arranged within a surrounding situation display image. On the other hand, because the image of the road marking is a straight line when the host vehicle M will travel on and pass through a straight road in the future, the display processor 140 can arrange all road markings recognized by the road marking recognizer 121 in the surrounding situation display image.

Thus, when the host vehicle M will travel on and pass through a straight road, the compression processor 125 may not perform the curvature compression process of compressing the curvature of the centerline of the traveling lane (the straight road). However, if the process is changed according to the shape of the road through which the host vehicle M will pass in the future, the control of the curvature compression process in the compression processor 125 becomes complicated. Thus, the compression processor 125 similarly performs the curvature compression process on the traveling lane regardless of whether the road through which the host vehicle M will pass in the future is a curved road or a straight road. For example, the curvature compression process of the compression processor 125 is performed by multiplying a radius of the traveling lane of the host vehicle M indicated in information of the radius output by the lane radius determiner 123 by a compression degree that is a conversion coefficient set for the radius of the traveling lane. For example, the compression degree is set to a higher degree when the radius of the traveling lane becomes smaller (the curvature thereof becomes larger). For example, the compression degree may be set to the highest degree when a radius is less than or equal to a first prescribed value associated with the small radius of the traveling lane (or the large curvature thereof), may be changed so that the value decreases in order from the first prescribed value to a second prescribed value associated with the large radius of the traveling lane (or the small curvature thereof), or may be set to a lowest degree when the radius thereof is greater than or equal to the second prescribed value. The compression degree may be set, for example, using a table in which a coefficient is associated with the radius of the traveling lane. The compression processor 125 outputs the information of the center positions representing the point sequence after the curvature compression process is performed to the display processor 140. Here, the information of the center positions output by the compression processor 125 to the display processor 140 is based on the information of the point sequence in which the road marking recognizer 121 detects the left and right road markings of the traveling lane for each prescribed distance. That is, the amount of information (the amount of data) is reduced by thinning out the information of the two road markings in the traveling lane. Thus, when the recognizer 120 and the display processor 140 are arranged at separate positions in the host vehicle M and are connected by communication lines, the amount of communication for transmitting information of the traveling lane is reduced and the load of communication between the recognizer 120 and the display processor 140 is reduced.

Further, the compression processor 125 also performs a compression process (hereinafter referred to as a "distance compression process") of similarly compressing and decreasing the another vehicle distance included in the information of the another vehicle V output by the another vehicle recognizer 124. However, for example, the compression processor 125 performs the distance compression process of compressing the another vehicle distance at a compression degree (hereinafter referred to as a "second compression degree") that is a conversion coefficient set with respect to the radius of the traveling lane after the another vehicle distance is associated with the road marking whose curvature has been decreased in the curvature compression process performed on the traveling lane (and an association result is reflected). That is, the compression processor 125 first performs the curvature compression process and then performs the distance compression process by multiplying the another vehicle distance by the second compression degree without performing the curvature compression process and the distance compression process at the same time. For example, the second compression degree may be the same as the compression degree for use in the curvature compression process or may be different from a compression degree set with respect to the radius of the centerline of the traveling lane (the curved road) after the curvature is decreased in the curvature compression process, i.e., the compression degree for use in the curvature compression process. At this time, the compression processor 125 may perform the distance compression process when the another vehicle V indicated in the information of the another vehicle V output by the another vehicle recognizer 124 is the another vehicle V traveling in the adjacent lane and may not perform the distance compression process when the another vehicle V is traveling in the same traveling lane as the host vehicle M. This is because the another vehicle distance is the distance away from the traveling lane of the host vehicle M and therefore the distance is further increased by compressing the curvature of the traveling lane (the centerline) in the curvature compression process when the another vehicle V is traveling in the adjacent lane, whereas the another vehicle distance is a value within the lane width of the traveling lane and therefore the influence of the curvature compression process decreases when the another vehicle V is traveling in the same traveling lane as the host vehicle M. The compression processor 125 outputs information of the another vehicle V including the another vehicle distance after the compression process of compressing the another vehicle distance is performed to the display processor 140. Here, the another vehicle distance included in the information of the another vehicle V output by the compression processor 125 to the display processor 140 is based on one information element indicating the distance between two positions that are the reference position of the another vehicle V detected by the another vehicle recognizer 124 and a position on the road marking near the another vehicle V (the another vehicle distance before the distance compression process). Thus, when the recognizer 120 and the display processor 140 are arranged at separate positions in the host vehicle M and are connected by communication lines, the amount of communication for transmitting the information of the another vehicle V is decreased and the load of communication between the recognizer 120 and the display processor 140 is decreased.

The display processor 140 generates a surrounding situation display image indicating the situation of the surroundings of the host vehicle M on the basis of information of the lane width output by the road marking recognizer 121 and information of the center positions after the compression process output by the compression processor 125. The display processor 140 may generate a surrounding situation display image including the another vehicle V on the basis of information of the another vehicle V after the compression process output by the compression processor 125. The display processor 140 causes the display device 20 to display the generated surrounding situation display image by outputting the surrounding situation display image to the display device 20.

The display information generator 142 generates a surrounding situation display image. In the surrounding situation display image, for example, the host vehicle icon representing the host vehicle M is arranged at the center thereof and the road marking recognized by the road marking recognizer 121 is restored at a position where the road surface in front of the host vehicle M is displayed so that a lane in which the host vehicle M is traveling is shown in a basic configuration. More specifically, the display information generator 142 applies a lane width indicated in the information of the lane width output by the road marking recognizer 121 with respect to each center position indicated in information of the center positions after the compression process output by the compression processor 125. At this time, the display information generator 142 determines the amount of offset for offsetting the lane width in the left-right direction so that the center of the lane width is at each center position and offsets each lane width by the determined amount of offset to apply the offset lane width. The display information generator 142 determines a position where the road marking restored within the surrounding situation display image is arranged by connecting positions of the end portion of each applied lane width in the direction of the road surface in front of the host vehicle M.

Further, the display information generator 142 arranges the another vehicle icon representing the another vehicle V in the surrounding situation display image including the host vehicle icon and the restored road marking. More specifically, the display information generator 142 arranges the another vehicle icon at the position of the another vehicle distance indicated in the information of the another vehicle V after the compression process output by the compression processor 125. At this time, when information indicating the vehicle type is included in the information of the another vehicle V output by the compression processor 125, the display information generator 142 may display the another vehicle icon in a shape according to the vehicle type of the another vehicle V.

Further, when the host vehicle M is traveling while tracking another vehicle V traveling in the same traveling lane as the host vehicle M according to a driving assistance function based on adaptive cruise control (ACC), the display information generator 142 may arrange a tracking icon representing that the ACC driving assistance is provided in the host vehicle M at a position of another vehicle icon of the another vehicle V that is being tracked.

In this way, the display information generator 142 generates a surrounding situation display image including at least the host vehicle icon and the restored road marking. The display information generator 142 causes the display device 20 to display the generated surrounding situation display image by outputting the surrounding situation display image to the display device 20. Thereby, the display device 20 displays the surrounding situation display image output by the display processor 140 (more specifically, the display information generator 142) in a prescribed display area and presents the situation of the surroundings of the host vehicle M to the driver of the host vehicle M.

[Example of Process of Vehicle Display Control Device]

Figure 2:
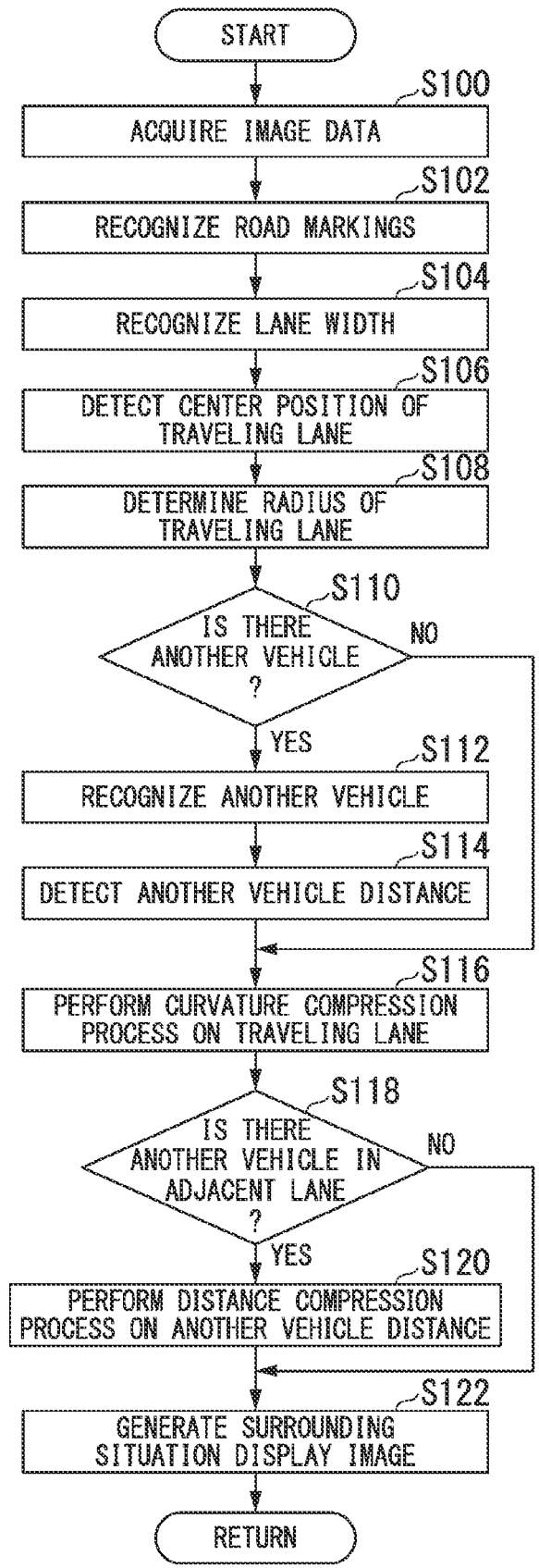
FIG. 2 is a flowchart showing an example of a flow of a process executed by the vehicle display control device.
Figure 3:
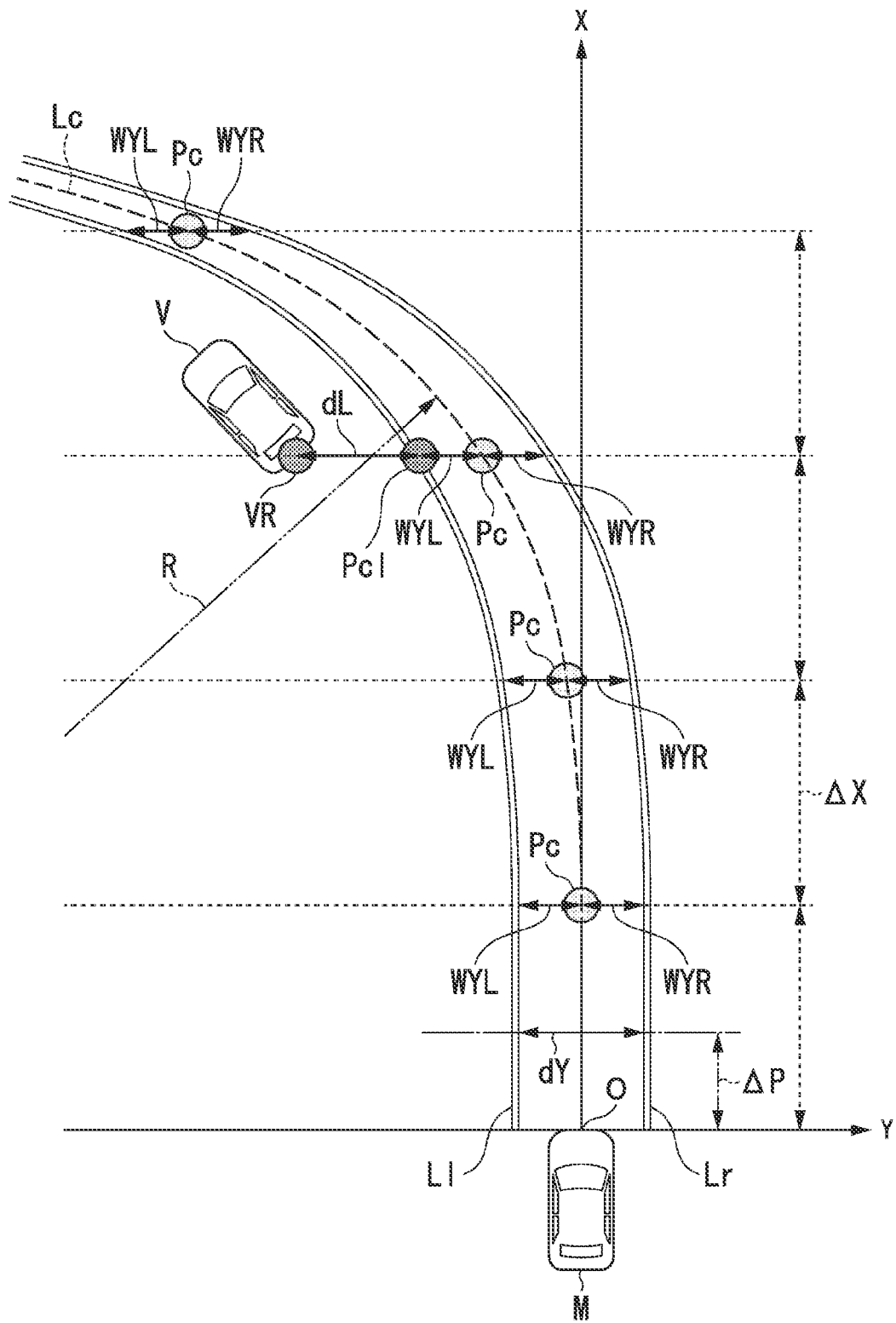
FIG. 3 is a diagram showing an example of a situation of a road recognized by a recognizer.
Figure 4:
FIG. 4 is a diagram showing an example of a compression degree for use in a compression process of a compression processor.
Figure 5:
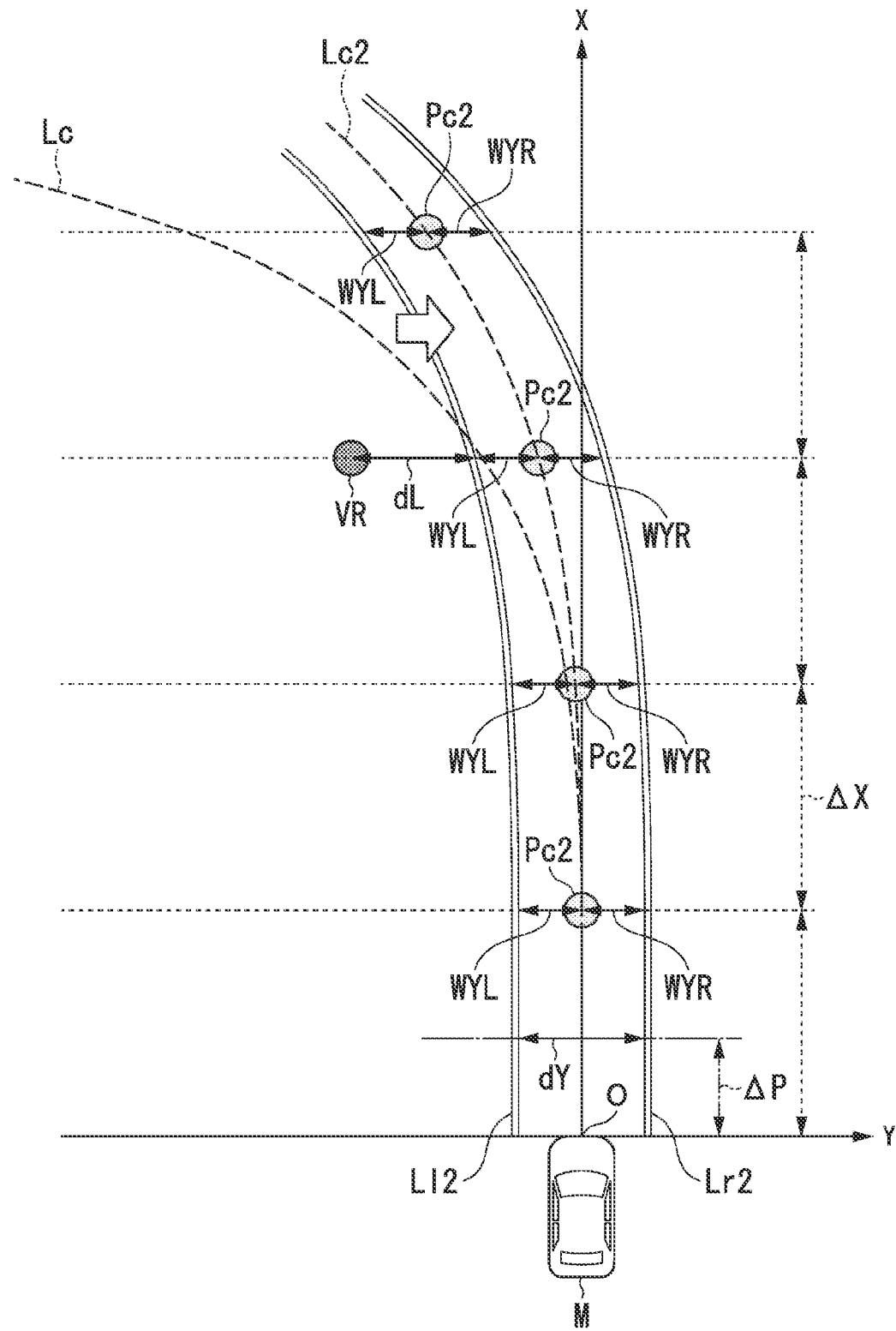
FIG. 5 is a diagram (part 1) showing an example of the compression process of the compression processor.
Figure 6:
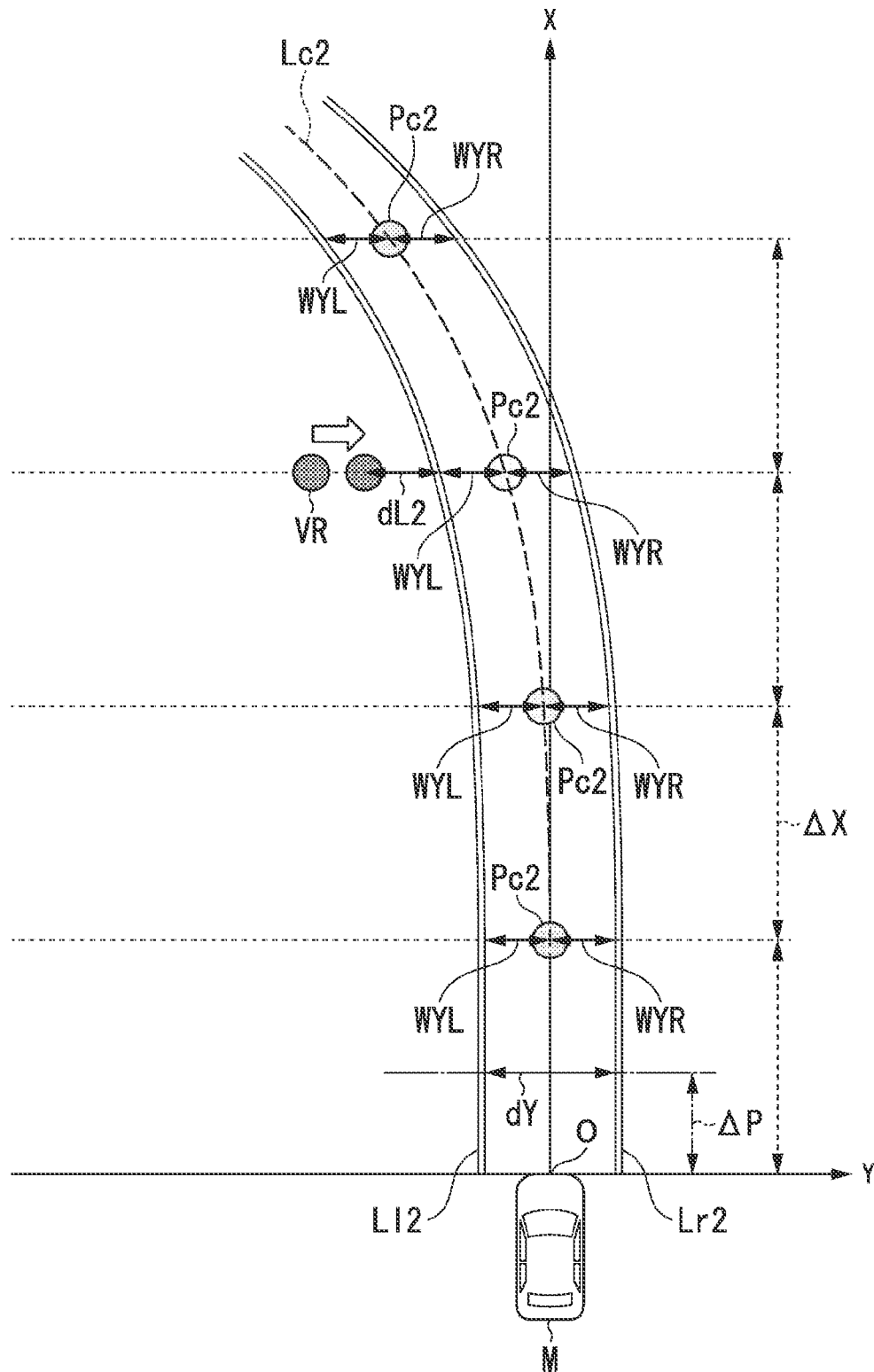
FIG. 6 is a diagram (part 2) showing an example of the compression process of the compression processor.
Figure 7:
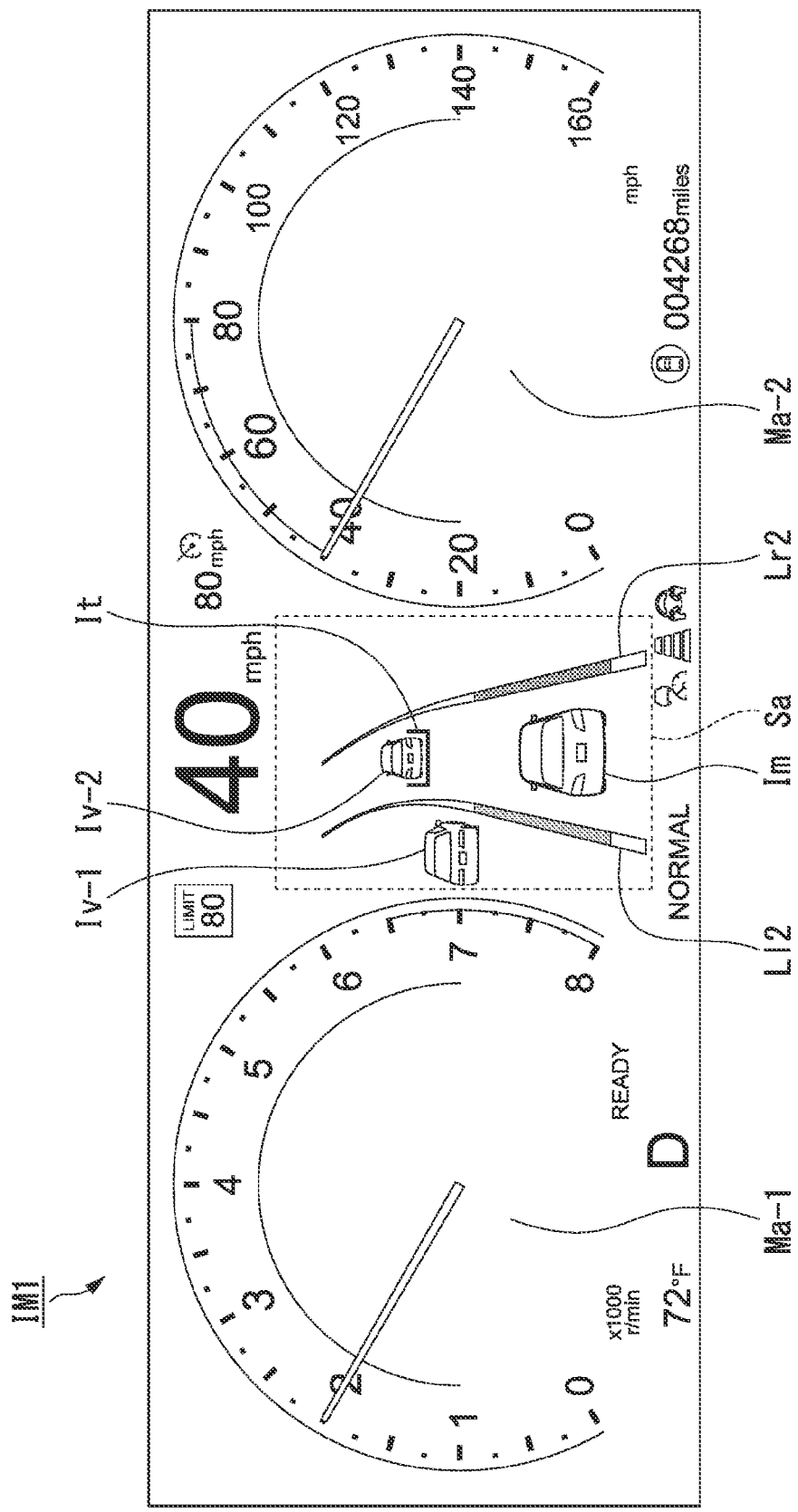
FIG. 7 is a diagram showing an example (part 1) of a surrounding situation display image.
Figure 8:
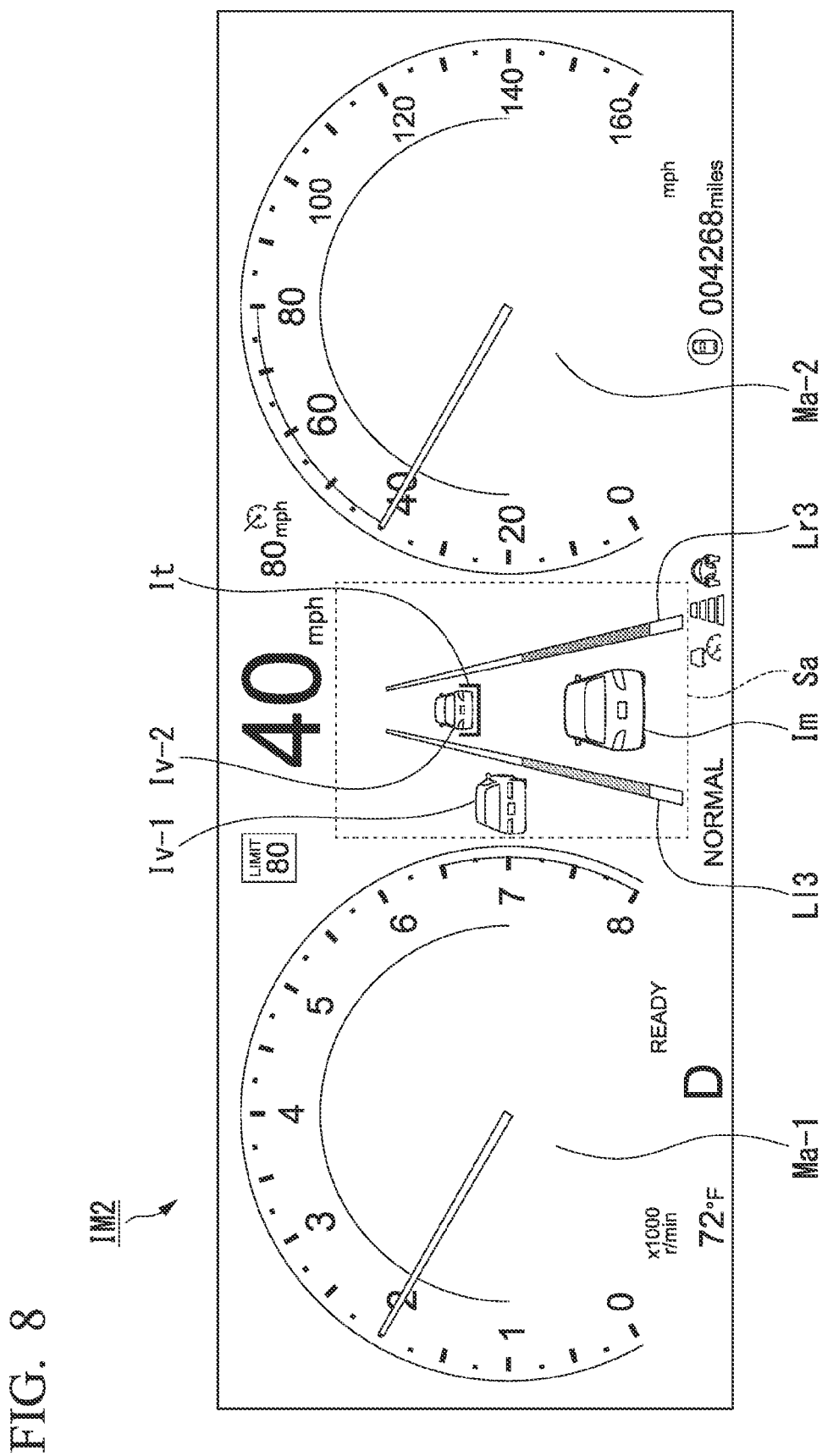
FIG. 8 is a diagram showing an example (part 2) of the surrounding situation display image.

Next, a process of the vehicle display control device 100 will be described. FIG. 2 is a flowchart showing an example of a flow of a process executed by the vehicle display control device 100. FIGS. 3 to 8 are diagrams showing the process executed by the vehicle display control device 100. In FIG. 3, an example of an overhead view plane showing the situation of a road recognized by the recognizer 120 when the host vehicle M will travel on a curved road that significantly curves to the left in the future is shown. The situation of the road of the example shown in FIG. 3 is an example of a situation of the road where all road markings recognized by the road marking recognizer 121 cannot be arranged within a display area of the surrounding situation display image when the display processor 140 has generated the surrounding situation display image indicating the state of FIG. 3, i.e., when the display processor 140 has generated the surrounding situation display image without performing the curvature compression process to be described below. In FIG. 4, an example of a compression degree for use in the compression process of the compression processor 125 is shown. In FIG. 5, an example of an overhead view plane in which the compression processor 125 performs a curvature compression process is shown. In FIG. 6, an example of an overhead view plane on which the compression processor 125 performs a distance compression process is shown. In FIG. 7, an example of a surrounding situation display image generated by the display information generator 142 and displayed on the display device 20 is shown. In FIG. 8, another example of the surrounding situation display image is shown.

In the following description, the process executed by the vehicle display control device 100 will be described with appropriate reference to FIGS. 3 to 8. In the following description, it is assumed that each component of the vehicle display control device 100 appropriately performs a corresponding process. However, in the following description, it is assumed that there is no another vehicle V traveling in the same driving lane as the host vehicle M and there is another vehicle V traveling in the adjacent lane. In the following description, it is assumed that the second compression degree for use in the distance compression process is the same as the compression degree for use in the curvature compression process. The process of the present flowchart is iteratively executed at each prescribed time interval in which the detection device 10 images the surroundings of the host vehicle M while the host vehicle M is traveling (moving).

When the detection device 10 images the surroundings of the host vehicle M, the vehicle display control device 100 acquires image data from the detection device 10 (step S100).

The road marking recognizer 121 recognizes road markings on the basis of the acquired image data (step S102). The road marking recognizer 121 outputs information of the recognized road markings to each of the lane center detector 122 and the another vehicle recognizer 124. In the example shown in FIG. 3, the road marking recognizer 121 sets the center of the host vehicle M as the origin O, sets the X-axis in a forward direction, and sets the Y-axis in a left-right direction orthogonal to the X-axis with respect to the overhead view data based on the acquired image data. Here, the XY coordinates set by the road marking recognizer 121 are shared by the components provided in the recognizer 120. In this state, the road marking recognizer 121 recognizes a road marking Ll on the left side of the traveling lane and a road marking Lr on the right side thereof. The road marking recognizer 121 outputs information indicating the recognized road marking Ll and the recognized road marking Lr (for example, coordinate values of XY coordinates) to each of the lane center detector 122 and the another vehicle recognizer 124. The X-axis direction is an example of a "first direction" in the claims and the Y-axis direction is an example of a "second direction" in the claims.

The road marking recognizer 121 detects a lane width on the basis of the acquired image data (step S104). The road marking recognizer 121 outputs information of the detected lane width to the display processor 140. In the example shown in FIG. 3, the road marking recognizer 121 detects a lane width dY between the road marking Ll and the road marking Lr at a position of a prescribed distance ΔP. The road marking recognizer 121 outputs the detected lane width dY (for example, the length) to the display processor 140. The prescribed distance ΔP is an example of a "second distance" in the claims.

The lane center detector 122 detects a center position of the traveling lane in which the host vehicle M travels for each prescribed distance on the basis of the information of the road markings output by the road marking recognizer 121 (step S106). The lane center detector 122 outputs information indicating a point sequence of center positions that have been detected to each of the lane radius determiner 123, the another vehicle recognizer 124, and the compression processor 125. In the example shown in FIG. 3, the lane center detector 122 detects center positions Pc for each prescribed distance ΔX at a position where a left width WYL and a right width WYR are equal. The lane center detector 122 outputs information (for example, coordinate values of XY coordinates) indicating the detected center positions Pc to each of the lane radius determiner 123, the another vehicle recognizer 124, and the compression processor 125. The prescribed distance ΔX is an example of a "first distance" in the claims.

The lane radius determiner 123 determines a radius of the traveling lane in front of the host vehicle M that is traveling on the basis of information of center positions output by the lane center detector 122 (step S108). The lane radius determiner 123 outputs information indicating the determined radius of the traveling lane to the compression processor 125. In the example shown in FIG. 3, the lane radius determiner 123 obtains a centerline Lc of the traveling lane by connecting the center positions Pc. The lane radius determiner 123 determines a radius R of the traveling lane in which the host vehicle M travels on the basis of the obtained centerline Lc. The lane radius determiner 123 outputs the determined radius R (for example, a length) to the compression processor 125.

The another vehicle recognizer 124 determines whether or not the another vehicle V is present on the basis of the acquired image data (step S110). When it is determined that the another vehicle V is not present in step S110, the another vehicle recognizer 124 moves the process to step S116.

On the other hand, when it is determined that another vehicle V is present in step S110, the another vehicle recognizer 124 recognizes the another vehicle V on the basis of the acquired image data (step S112). Further, the another vehicle recognizer 124 detects another vehicle distance corresponding to the recognized another vehicle V (step S114). The another vehicle recognizer 124 outputs information of the recognized another vehicle V (including information of the another vehicle distance) to the compression processor 125. In the example shown in FIG. 3, the another vehicle recognizer 124 recognizes the another vehicle V traveling in the adjacent lane. The another vehicle recognizer 124 detects another vehicle distance dL between a reference position VR of the recognized another vehicle V and a position Pc1 on the road marking Ll corresponding to the center position Pc closest to the reference position VR. The another vehicle recognizer 124 outputs information of the another vehicle V including information of the position indicating how far the recognized another vehicle V is from the X-axis in the adjacent lane on the road marking Ll side (for example, the information may be a coordinate value of XY coordinates of the reference position VR) and the another vehicle distance dL (for example, the length) to the compression processor 125. The another vehicle distance dL is an example of a "third distance" in the claims.

The compression processor 125 performs a curvature compression process on the traveling lane on the basis of the radius output by the lane radius determiner 123 (step S116). That is, the compression processor 125 performs a curvature compression process of compressing the curvature of the centerline. At this time, the compression processor 125 performs the curvature compression process using the compression degree set as in the example shown in FIG. 4. In the example shown in FIG. 4, the compression degree C. is set with respect to a size of a radius R. More specifically, in the example shown in FIG. 4, an example in which the compression degree C. is highest when the radius R is less than or equal to a radius R1, which is relatively small (and in which the curvature is large), the compression degree C. decreases in order from the radius R1 to a radius R2, the compression degree C. further decreases in order from the radius R2 to a radius R3, and the compression degree C. is lowest for the radius R3 or more is shown. The compression processor 125 performs a curvature compression process of compressing the curvature of the centerline Lc by multiplying the radius R output by the lane radius determiner 123 by the corresponding compression degree C. More specifically, the compression processor 125 decreases (compresses) the curvature of the centerline Lc by multiplying the coordinate value (the Y coordinate) of each center position Pc in the Y-axis direction by the compression degree C. and moving a position, which is the center position Pc, in the Y-axis direction. In the example shown in FIG. 5, an example in which the curvature of the curved portion in the centerline Lc is decreased (compressed) in the curvature compression process of the compression processor 125 and the centerline Lc moves in the Y-axis direction as shown in the centerline Lc2 is shown. In FIG. 5, a road marking Ll2, a road marking Lr2, a lane width dY, and a center positions Pc2 when the curvature compression process of the compression processor 125 is completed are shown together. As shown in FIG. 5, the lane width dY does not change even if the curvature compression process of the compression processor 125 is completed. Thus, although the position of the center position Pc is moved to the center position Pc2 in the Y-axis direction in the curvature compression process of the compression processor 125 as shown in FIG. 5, the length of the left width WYL or the right width WYR does not change, i.e., it is the same as the length of the example shown in FIG. 3. Furthermore, in FIG. 5, the reference position VR when the another vehicle distance dL is reflected in the state in which the curvature compression process of the compression processor 125 is completed is shown. Because the compression processor 125 does not perform the distance compression process at the stage of step S116, the length of the another vehicle distance dL is not converted (the length remains the same as that of the example shown in FIG. 3), and the position of the reference position VR is only moved in the Y-axis direction by an amount corresponding to the curvature compression process of the compression processor 125 as shown in FIG. 5. The compression processor 125 outputs information of center positions (for example, coordinate values of the XY coordinates of the center positions Pc2 representing the centerline Lc2 after the curvature compression process) representing a point sequence (a point sequence corresponding to the centerline Lc2 shown in FIG. 5) after the curvature compression process is performed to the display processor 140.

Subsequently, the compression processor 125 determines whether or not the another vehicle V is present in the adjacent lane on the basis of the information of the another vehicle V output by the another vehicle recognizer 124 (step S118). In other words, the compression processor 125 determines whether or not the another vehicle V recognized by the compression processor 125 is present in the adjacent lane. When it is determined that the another vehicle V is not present in the adjacent lane in step S118, the compression processor 125 outputs the information of the another vehicle V (including the information of the another vehicle distance) output by the another vehicle recognizer 124 to the display processor 140 as it is and moves the process to step S122.

On the other hand, when it is determined that the another vehicle V is present in the adjacent lane in step S118, the compression processor 125 performs the distance compression process on the another vehicle distance included in the information of the another vehicle V output by the another vehicle recognizer 124 (step S120). In the example shown in FIG. 6, an example in which the another vehicle distance dL reflected in the state in which the curvature compression process of the compression processor 125 is completed in the distance compression process of the compression processor 125 is multiplied by a second compression degree that is a compression degree C. equal to that of the curvature compression process and is compressed (decreased) to another vehicle distance dL2 is shown. Thereby, the reference position VR is moved in the Y-axis direction as shown in the example of FIG. 6. The compression processor 125 outputs information of the another vehicle V including the another vehicle distance dL after the distance compression process is performed, i.e., the another vehicle distance dL2 (for example, a length), to the display processor 140.

Subsequently, the display information generator 142 generates a surrounding situation display image (step S122). Here, the surrounding situation display image generated by the display information generator 142 is, for example, the surrounding situation display image showing the state of the example shown in FIG. 6 instead of the surrounding situation display image showing the state of the example shown in FIG. 3. More specifically, the display information generator 142 first arranges the host vehicle icon in the surrounding situation display image. The display information generator 142 restores a road marking Ll2 and a road marking Lr2 by applying a lane width dY (the length) output by the road marking recognizer 121 with respect to the center positions Pc2 (XY coordinates) representing the centerline Lc2 output by the compression processor 125 and determines positions where the restored road marking Ll and the restored road marking Lr are arranged in the surrounding situation display image in which the host vehicle icon is arranged. Finally, another vehicle icon is arranged at a position where another vehicle distance dL2 is reflected in the surrounding situation display image in which the host vehicle icon, the road marking Ll, and the road marking Lr are arranged on the basis of the information of the another vehicle V output by the compression processor 125. In this way, the display information generator 142 generates a surrounding situation display image on the basis of the information output by each component provided in the recognizer 120. The display information generator 142 causes the situation of the surroundings of the host vehicle M to be presented to the driver by outputting the generated surrounding situation display image to the display device 20 and causing the display device 20 to display the surrounding situation display image. The vehicle display control device 100 ends the process of the present flowchart for currently acquired image data.

Here, the surrounding situation display image generated by the display information generator 142 in step S122 represents the state of an example shown in FIG. 6, i.e., the situation of the surroundings of the host vehicle M is represented by an overhead view plane. Thus, the display information generator 142 may be configured to convert the generated surrounding situation display image so that a forward direction (a depth direction) is represented when the host vehicle M is used as a reference (i.e., conversion into a perspective view) and output the converted surrounding situation display image to the display device 20. More specifically, the display information generator 142 may be configured to represent the depth direction when the host vehicle M is used as the reference by performing a conversion process of compressing coordinates of each road marking in the X-axis direction so that the distance between the road marking Ll and the road marking Lr restored in the surrounding situation display image decreases as the distance from the host vehicle M increases. At this time, the display information generator 142 may perform a smoothing process so that each road marking becomes smooth.

In FIG. 7, an example in which an information image IM1 including the surrounding situation display image showing the state of the example shown in FIG. 6 is displayed in the entire display area of the display device 20 is shown. As described above, the display device 20 displays various types of information to be presented to the driver of the host vehicle M. In the example of the information image IM1 shown in FIG. 7, a tachometer image Ma-1 is displayed on the left side of the display area, a speedometer image Ma-2 is displayed on the right side thereof, and a surrounding situation display image is displayed at a position between them. When the host vehicle M is an electric vehicle such as an electric vehicle or a hybrid vehicle that travels using electric power supplied to the electric motor, the tachometer image Ma-1 may be replaced with other information or may be omitted. In the information image IM1 shown in FIG. 7, various types of other information and icons representing the information are displayed. In the information image IM1 shown in FIG. 7, the position or the area within the information image IM1 in which each image or icon, i.e., the surrounding situation display image, the tachometer image Ma-1, the speedometer image Ma-2, and various types of other information are arranged is predetermined. The information image IM1 shown in FIG. 7 shows an example of a case where a surrounding situation display image is arranged in a display area Sa.

In an example of the surrounding situation display image in the information image IM1 shown in FIG. 7, the host vehicle icon Im representing the host vehicle M is arranged at the center thereof and an image of road markings simulating the restored road marking Ll2 and the restored road marking Lr2 is arranged to represent the lane in which the host vehicle M travels. The road marking Ll2 and the road marking Lr2 have a shape having a degree of curvature that is gentler than the curvature of the actual traveling lane in accordance with the curvature compression process of the compression processor 125. Thus, in the surrounding situation display image, the road marking Ll2 and the road marking Lr2 are arranged to represent all road markings recognized by the road marking recognizer 121. The above-described road marking arrangement process of representing all road markings recognized by the road marking recognizer 121 is more preferable for the driver than a process of displaying the road markings actually recognized by the road marking recognizer 121 as they are (for example, the road markings of the curved road significantly curving to the left as in the example shown in FIG. 3) in the surrounding situation display image.

In an example of the surrounding situation display image within the information image IM1 shown in FIG. 7, another vehicle icon Iv (hereinafter referred to as "another vehicle icon Iv-1") representing another vehicle V (hereinafter referred to as "another vehicle V-1") that travels in the adjacent lane adjacent to the left recognized by the another vehicle recognizer 124 is arranged at a position corresponding to a position where the another vehicle V-1 is present. Furthermore, in an example of the surrounding situation display image shown in FIG. 7, the another vehicle recognizer 124 recognizes another vehicle V (hereinafter referred to as "another vehicle V-2") traveling in front of the host vehicle M and another vehicle icon Iv-2 representing the another vehicle V-2 is arranged at a position corresponding to that in front of the host vehicle M. The surrounding situation display image does not include information of an intersection present in front of the host vehicle M or another vehicle V passing through the intersection, i.e., crossing the front of the host vehicle M. Although an example in which another vehicle icon Iv represents a passenger car is shown in an example of the surrounding situation display image shown in FIG. 7, a shape of the another vehicle icon Iv may change on the basis of information of the another vehicle V output by the another vehicle recognizer 124. That is, the another vehicle icon Iv may be changed to a shape representing a truck or a shape representing a motorcycle.

Further, because a case where the host vehicle M is traveling while tracking the another vehicle V-2 according to a driving assistance function based on adaptive cruise control (ACC) is represented in the example of the surrounding situation display image shown in FIG. 7, a tracking icon It is arranged at a position behind the another vehicle V-2 (more specifically, below the another vehicle icon Iv-2). In the surrounding situation display image, the distance from the host vehicle M in the depth direction to be represented may differ according to whether or not the ACC driving assistance is provided in the host vehicle M. For example, a length of the depth direction may be lengthened (for example, the depth direction is represented up to an available imaging range (i.e., an available detection range) in the detection device 10) when the ACC driving assistance is provided in the host vehicle M and the length of the depth direction may be shorter when the ACC driving assistance is not provided than when the ACC driving assistance is provided in the host vehicle M.

Incidentally, as described above, the compression processor 125 similarly performs a curvature compression process on the traveling lane regardless of whether a road through which the host vehicle M will pass in the future is a curved road or a straight road. In this case, although a radius of the straight path is multiplied by a lowest compression degree because the radius of the straight path is significantly large, each center position does not move in the Y-axis direction in the curvature compression process. Even in this case, the compression processor 125 performs the distance compression process on the another vehicle distance included in the information of the another vehicle V. However, because the another vehicle distance is the distance between a reference position of the another vehicle V and a position on the road marking closer to the another vehicle V extracted by the another vehicle recognizer 124, the reference position of the another vehicle V is not within the traveling lane in which the host vehicle M is traveling according to the another vehicle distance after the distance compression process is performed even if the compression processor 125 performs the distance compression process. That is, the position of the another vehicle V traveling in the adjacent lane does not become a position within the same traveling lane as the host vehicle M.

Here, an example of the surrounding situation display image when the host vehicle M will travel on a straight road in the future will be described. In FIG. 8, an example in which an information image IM2 including a surrounding situation display image showing a state in which the host vehicle M passes through a straight road is displayed in the entire display area of the display device 20 is shown. Even in the example of the information image IM2 shown in FIG. 8, the surrounding situation display image is displayed at a position between the tachometer image Ma-1 and the speedometer image Ma-2 as in the example of the information image IM1 shown in FIG. 7. In an example of the surrounding situation display image in the information image IM2 shown in FIG. 8, the host vehicle icon Im is arranged at the center thereof and an image of road markings simulating the restored road marking Ll3 and the restored road marking Lr3 is arranged so that the lane of the straight road on which the host vehicle M travels is displayed. Even in an example of the surrounding situation display image shown in FIG. 8, the road marking Ll3 and the road marking Lr3 are arranged so that all road markings of the straight road recognized by the road marking recognizer 121 are displayed. Even in an example of the surrounding situation display image shown in FIG. 8, the another vehicle icon Iv-1 is arranged so that the position of the another vehicle V-1 traveling in the adjacent lane adjacent to the left side is displayed. In the example of the surrounding situation display image shown in FIG. 8, other icons and information are arranged as in the example of the surrounding situation display image shown in FIG. 7. As described above, even if the compression processor 125 performs the compression process similarly regardless of the road through which the host vehicle M will pass in the future, the positional relationship between the host vehicle M and the another vehicle V does not change. Thereby, even if the surrounding situation display image is switched as the road through which the host vehicle M will pass in the future changes, a sense of unnatural discomfort is not given to the driver of the host vehicle M.

The display device 20 presents various information about the traveling of the host vehicle M to the driver of the host vehicle M by displaying information images such as the information image IM1 and the information image IM2. Information other than the surrounding situation display image included in the information image IM1 and the information image IM2 may be generated by a display processor (not shown) different from the display processor 140 or may be generated by the display processor 140 together with the surrounding situation display image. That is, the display processor 140 may generate not only the surrounding situation display image but also the entire information image to be displayed on the display device 20.

According to such a configuration and process, the vehicle display control device 100 acquires image data in an imaging process of the detection device 10 and recognizes a road on which the host vehicle M will travel in the future. The vehicle display control device 100 reduces (compresses) the curvature of the recognized road so that the entire recognized road is displayed in the surrounding situation display image. That is, the vehicle display control device 100 reduces (compresses) the curvature of the road so that the images of the road marking Ll and the road marking Lr representing the recognized road are arranged in the surrounding situation display image all the time. Further, the vehicle display control device 100 recognizes another vehicle V traveling near the host vehicle M. The vehicle display control device 100 causes the distance between the road marking of the road and the another vehicle V to be compressed at the second compression degree (which may be, for example, the same as or different from a compression degree at which the curvature of the road has been decreased (compressed)) so that the positional relationship between the recognized another vehicle V and the road on which the host vehicle M will travel in the future does not change. In other words, the vehicle display control device 100 changes the position of the another vehicle V according to the road whose curvature is reduced (compressed). The vehicle display control device 100 generates a surrounding situation display image including the recognized road and the another vehicle V and causes the display device 20 to display the surrounding situation display image. Thereby, a case where a shape of the road on which the host vehicle M will travel in the future or a position of the another vehicle V displayed in the surrounding situation display image is outside of a range (a display area) of the surrounding situation display image can be avoided in the host vehicle M in which the vehicle display control device 100 is mounted. Thereby, the driver of the host vehicle M in which the vehicle display control device 100 is mounted can cause the host vehicle M to travel while ascertaining the situation of surroundings in a state in which information of a relative positional relationship associated with the another vehicle V present near the host vehicle M is not damaged.

Moreover, in the vehicle display control device 100, the recognizer 120 reduces the amount of information (the amount of data) associated with a road or another vehicle V that has been recognized and outputs (transmits) information (data) to the display processor 140 that generates a surrounding situation display image. Thus, in the vehicle display control device 100, even if the recognizer 120 and the display processor 140 are arranged at distant positions in the host vehicle M and connected by communication lines, the amount of communication can be reduced in a processing process until a surrounding situation display image for allowing the driver to recognize a relative positional relationship associated with the surroundings of the host vehicle M or the another vehicle V is displayed and the load of communication between the recognizer 120 and the display processor 140 is reduced.

In the embodiment, the configuration of the vehicle display control device 100 when the recognizer 120 includes the compression processor 125 has been described. However, the compression processor 125 may be, for example, a component provided in the display processor 140. In this case, it is only necessary for the operations and processes of other components provided in the compression processor 125 or the recognizer 120 and the components provided in the display processor 140 to be equivalent to the operations and processes of the above-described embodiment.

According to the above-described embodiment, the vehicle display control device 100 includes the recognizer 120 configured to recognize road markings (a road marking Ll and a road marking Lr) of a road on which the host vehicle M travels on the basis of at least an output of the detection device 10 that detects target objects (road markings and another vehicle V) present in a traveling direction of the host vehicle M; and the display processor 140 configured to cause the display device 20 to display a surrounding situation display image including a host vehicle icon Im representing the host vehicle M and an image of the road markings representing the road, wherein the recognizer 120 transmits (outputs) information of center positions (for example, center positions Pc) of a traveling lane obtained by representing the center positions in a point sequence for each prescribed first distance (for example, a prescribed distance ΔX) with respect to an X-axis direction on the basis of the recognized road markings to the display processor 140, and wherein the display processor 140 determines positions of the road markings on the basis of the information of the center positions that has been received (input) and generates the surrounding situation display image, whereby it is possible to reduce the amount of communication in a processing process until a surrounding situation display image for allowing the driver to recognize a relative positional relationship associated with the surroundings of the host vehicle M and the another vehicle V is displayed. The driver of the host vehicle M in which the vehicle display control device 100 is mounted can cause the host vehicle M to travel while ascertaining the situation of surroundings in a state in which information of a relative positional relationship associated with the another vehicle V present near the host vehicle M is not damaged.

The embodiment described above can be represented as follows.

A vehicle display control device including:

a hardware processor, and a storage device storing a program, wherein the hardware processor reads and executes the program stored in the storage device to:

recognize road markings of a road on which a host vehicle travels based on at least an output of a detection device that detects target objects present in a traveling direction of the host vehicle;

represent center positions of a traveling lane in a point sequence for each prescribed first distance with respect to a first direction based on the recognized road markings; and determine positions of the road markings based on information of the center positions when a display device is allowed to display a surrounding situation display image including a host vehicle icon representing the host vehicle and an image of the road markings representing the road.

Although modes for carrying out the present invention have been described using embodiments, the present invention is not limited to the embodiments and various modifications and substitutions can also be made without departing from the scope and spirit of the present invention.

What is claimed is:

1. A vehicle display control device comprising a processor configured to execute computer-readable instructions to perform:

recognizing road markings of a road on which a host vehicle travels based on at least an output of a detection device that detects target objects present in a traveling direction of the host vehicle;

causing a display device to display a surrounding situation display image including a host vehicle icon representing the host vehicle and an image of the road markings representing the road;

determining positions of the road markings based on information of center positions of a traveling lane obtained by representing the center positions in a point sequence for each prescribed first distance with respect to a first direction; and generating the surrounding situation display image, wherein the processor is configured to execute the computer-readable instructions to perform:

detecting a lane width of one of traveling lanes at a position of a prescribed second distance associated with the first direction in the host vehicle based on the output of the detection device; and determining a distance between the road markings that have been determined based on the information of the detected lane width, wherein the processor is configured to execute the computer-readable instructions to perform:
determining the positions of the road markings by connecting positions offset from the center positions indicated in the information of the center positions in a left-right direction with respect to the lane width of the traveling lane indicated in the information of the lane width, and
wherein the processor is configured to execute the computer-readable instructions to perform:
recognizing a radius of the road based on a plurality of center positions in an overhead view plane viewed from above; and
obtaining the information of the center positions by multiplying the recognized radius by a compression degree according to the radius in a second direction orthogonal to the first direction to decrease curvature of a centerline connecting the center positions.

2. The vehicle display control device according to claim 1,
wherein the target objects further include another vehicle that is traveling in front of the host vehicle,
wherein the processor is configured to execute the computer-readable instructions to perform:
when the another vehicle has been recognized,
detecting a third distance between a reference position of the another vehicle and a position close to the reference position among positions on the road marking at a position corresponding to the second direction of the center position closest to the reference position of the another vehicle;
determining an amount of offset from the road marking associated with the position close to the reference position based on the information of the third distance; and
generating the surrounding situation display image including another vehicle icon representing the another vehicle at a position where the another vehicle is present determined by the amount of offset.

3. The vehicle display control device according to claim 2,
wherein the processor is configured to execute the computer-readable instructions to perform:
recognizing whether the another vehicle is traveling in front of the host vehicle in the traveling lane or traveling in an adjacent lane adjacent to the traveling lane based on the output of the detection device;
when it is recognized that the another vehicle is traveling in the adjacent lane, determining the amount of offset based on information of a distance obtained by multiplying the third distance by a second compression degree according to the radius after curvature of the centerline is decreased; and
when it is recognized that the another vehicle is traveling in front of the host vehicle in the traveling lane, determining the amount of offset based on the information of the third distance as it is.

4. The vehicle display control device according to claim 1,
wherein the processor is configured to execute the computer-readable instructions to perform:
increasing the compression degree as the radius of the road decreases.

5. The vehicle display control device according to claim 4,
wherein the processor is configured to execute the computer-readable instructions to perform:
increasing the compression degree to a highest degree when the radius of the road is less than or equal to a first prescribed value, changing the compression degree to cause the compression degree decreases from the first prescribed value to a second prescribed value in accordance with the radius of the road, and decreasing the compression degree to a lowest degree when the radius of the road is greater than or equal to the second prescribed value.

6. A control method of a vehicle display control device comprising:
recognizing, by a computer, road markings of a road on which a host vehicle travels based on at least an output of a detection device that detects target objects present in a traveling direction of the host vehicle;
representing, by the computer, center positions of a traveling lane in a point sequence for each prescribed first distance with respect to a first direction based on the recognized road markings; and
determining, by the computer, positions of the road markings based on information of the center positions when a display device is allowed to display a surrounding situation display image including a host vehicle icon representing the host vehicle and an image of the road markings representing the road,
wherein the control method further comprises:
detecting a lane width of one of traveling lanes at a position of a prescribed second distance associated with the first direction in the host vehicle based on the output of the detection device; and
determining a distance between the road markings that have been determined based on the information of the detected lane width,
wherein the control method further comprises:
determining the positions of the road markings by connecting positions offset from the center positions indicated in the information of the center positions in a left-right direction with respect to the lane width of the traveling lane indicated in the information of the lane width, and
wherein the control method further comprises:
recognizing a radius of the road based on a plurality of center positions in an overhead view plane viewed from above; and
obtaining the information of the center positions by multiplying the recognized radius by a compression degree according to the radius in a second direction orthogonal to the first direction to decrease curvature of a centerline connecting the center positions.

7. A non-transitory computer-readable storage medium storing a program for causing a computer to:
recognize road markings of a road on which a host vehicle travels based on at least an output of a detection device that detects target objects present in a traveling direction of the host vehicle;
represent center positions of a traveling lane in a point sequence for each prescribed first distance with respect to a first direction based on the recognized road markings; and
determine positions of the road markings based on information of the center positions when a display device is allowed to display a surrounding situation display image including a host vehicle icon representing the host vehicle and an image of the road markings representing the road,
wherein the program further causes the computer to:

detect a lane width of one of traveling lanes at a position of a prescribed second distance associated with the first direction in the host vehicle based on the output of the detection device; and determine a distance between the road markings that have been determined based on the information of the detected lane width, wherein the program further causes the computer to:

determine the positions of the road markings by connecting positions offset from the center positions indicated in the information of the center positions in a left-right direction with respect to the lane width of the traveling lane indicated in the information of the lane width, and wherein the program further causes the computer to:

recognize a radius of the road based on a plurality of center positions in an overhead view plane viewed from above; and obtain the information of the center positions by multiplying the recognized radius by a compression degree according to the radius in a second direction orthogonal to the first direction to decrease curvature of a centerline connecting the center positions.

\* \* \* \* \*